United States Patent
Miyaji et al.

(10) Patent No.: US 8,907,542 B2
(45) Date of Patent: Dec. 9, 2014

(54) ROTATING ELECTRICAL MACHINE WITH NOTCHED SLOTS FOR BENDING OF STATOR CORE

(75) Inventors: Wakaki Miyaji, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/772,537

(22) Filed: Jul. 2, 2007

(65) Prior Publication Data
US 2008/0179985 A1 Jul. 31, 2008

(30) Foreign Application Priority Data

Jan. 30, 2007 (JP) ................. 2007-019211

(51) Int. Cl.
*H02K 1/12* (2006.01)
*H02K 1/16* (2006.01)
*H02K 1/28* (2006.01)
*H02K 1/18* (2006.01)

(52) U.S. Cl.
CPC .. *H02K 1/16* (2013.01); *H02K 1/28* (2013.01); *H02K 1/185* (2013.01); *H02K 1/18* (2013.01); *H02K 2201/09* (2013.01)
USPC ...... 310/216.044; 310/216.004; 310/216.048; 29/596

(58) Field of Classification Search
CPC ............ H02K 1/18; H02K 1/185; H02K 1/28
USPC ........... 310/217, 258, 218, 216.044, 216.048; 29/596
IPC ....................................................... H02K 1/12
See application file for complete search history.

(56) References Cited

U.S. PATENT DOCUMENTS 3,110,831 A * 11/1963 Zimmerle ............... 310/216.048
3,590,208 A * 6/1971 Martini et al. ................. 219/92
(Continued)

FOREIGN PATENT DOCUMENTS

JP 52-34301 12/1899
JP 09-103052 A 4/1997
(Continued)

OTHER PUBLICATIONS

Engineer's Edge, "Strength of Materials—Mechanics of Materials", Design for Manufacturing DFM Public Training, Atlanta, Geogia, copyright 2000-2010.*

*Primary Examiner* — John K Kim
(74) *Attorney, Agent, or Firm* — Sughrue Mion, PLLC; Richard C. Turner

(57) ABSTRACT

An alternator of high quality and high performance includes a rotor, a stator core arranged so as to surround the rotor and having a plurality of axially extending slots arranged at a predetermined circumferential pitch, and a stator having a stator winding fitted into the slots. The stator core includes element iron cores of a hexahedral shape which are deformed to curve, with their adjacent end faces being abutted and bonded to each other, each of the element iron cores being composed of thin steel plates laminated and integrated with one another, with concave and convex portions formed on the thin steel plates being fitting with each other. The concave and convex portions are formed on a borderline between a compressive region of the stator core at an inner diameter side thereof and a tensile region of the stator core at an outer diameter side thereof.

5 Claims, 4 Drawing Sheets

(56) References Cited

U.S. PATENT DOCUMENTS

| | | | |
|---|---|---|---|
| 3,842,493 A * | 10/1974 | Ohuchi et al. | 29/596 |
| 3,886,256 A * | 5/1975 | Ohuchi et al. | 310/216.069 |
| 4,116,033 A | 9/1978 | Iwaki et al. | |
| 4,364,169 A * | 12/1982 | Kawano et al. | 29/596 |
| 4,900,636 A * | 2/1990 | Takenouchi et al. | 428/571 |
| 5,142,178 A * | 8/1992 | Kloster et al. | 310/216.048 |
| 5,489,811 A * | 2/1996 | Kern et al. | 310/216.044 |
| 6,337,529 B1 * | 1/2002 | Higashino et al. | 310/216.008 |
| 6,777,850 B2 * | 8/2004 | Harada et al. | 310/254 |
| 6,984,913 B2 * | 1/2006 | Neuenschwander | 310/216.048 |
| 7,062,841 B2 * | 6/2006 | Neuenschwander | 29/609 |
| 7,064,469 B2 * | 6/2006 | Jack et al. | 310/216 |
| 7,234,226 B2 * | 6/2007 | Fujita et al. | 29/598 |
| 8,115,362 B2 * | 2/2012 | Okamoto et al. | 310/216.135 |
| 2002/0079777 A1 * | 6/2002 | Sirois | 310/216 |
| 2002/0140315 A1 * | 10/2002 | Harada et al. | 310/254 |
| 2003/0020357 A1 * | 1/2003 | Harada et al. | 310/216 |
| 2004/0239191 A1 * | 12/2004 | Pflueger et al. | 310/10 |
| 2005/0093379 A1 * | 5/2005 | Tanabe et al. | 310/43 |
| 2005/0194858 A1 * | 9/2005 | Ahn | 310/216 |
| 2006/0001328 A1 * | 1/2006 | Rau et al. | 310/216 |
| 2006/0261698 A1 * | 11/2006 | Lee | 310/216 |
| 2006/0279161 A1 * | 12/2006 | Hitomi et al. | 310/216 |
| 2007/0096587 A1 * | 5/2007 | Ionel et al. | 310/218 |
| 2007/0126310 A1 * | 6/2007 | Tang et al. | 310/216 |
| 2008/0179985 A1 * | 7/2008 | Miyaji et al. | 310/216 |

FOREIGN PATENT DOCUMENTS

| | | |
|---|---|---|
| JP | 2001-245446 A | 9/2001 |
| JP | 2002-191142 A | 7/2002 |
| JP | 2005-535278 A | 11/2005 |

* cited by examiner

ROTATING ELECTRICAL MACHINE WITH NOTCHED SLOTS FOR BENDING OF STATOR CORE

BACKGROUND OF THE INVENTION

1. Field of the Invention

The present invention relates to a rotating electrical machine having a stator core that is composed of a plurality of thin steel plates laminated one over another and integrated with one another, with concave and convex portions formed on the individual thin steel plates being placed into mutual fitting engagement with one another.

2. Description of the Related Art

In the past, there has been known a vehicular alternator having a stator core comprising element iron cores of a hexahedral shape which are deformed to bend or curve, with their adjacent end faces being abutted against each other and bonded to each other, each of the element iron cores being composed of individual thin steel plates laminated and integrated with one another, with concave and convex portions formed on the individual thin steel plates being fitted or engaged with each other (see, for example, a first patent document: Japanese patent application laid-open No. 2002-191142 (FIG. 4)).

In this case, concave and convex portions are formed on each thin steel plate that has a film of a bonding material formed on its surface by means of press working, after which the thin steel plates are laminated one over another to form element iron cores, which are then heated and pressurized under prescribed conditions thereby to deform or shape the thus integrated element iron cores into a cylindrical configuration to provide a stator core.

In the stator core of the above-mentioned vehicular alternator, in order to integrate individual thin steel plates with one another, it is necessary to heat the bonding material applied to the surface of each thin steel plate and to pressurize it in a direction of lamination, so there is a problem of increasing both cost and man-hours.

In addition, with respect to the size or dimension in the direction of lamination of the steel plates, too, it is necessary to grasp the extent of melting of the bonding material, and the management of gaps between adjacent ones of the thin steel plates becomes complicated, thus making it difficult to obtain products of stable quality.

Moreover, there is also a fear of damage or peeling or falling off of the fixed bonding material when the element iron cores are subjected to bending deformation after having been bonded to one another.

On the other hand, it is considered that in order to strengthen the integration of the element iron cores of the stator core in a reliable manner, most portions of the outer peripheral side faces of the element iron cores are welded to one another, such a strategy is not practical in mass-produced goods.

SUMMARY OF THE INVENTION

The present invention is intended to obviate the problems as referred to above, and has for its object to provide a rotating electrical machine of high quality and high performance which is capable of suppressing trouble occurring upon bending deformation of element iron cores without the provision of new equipment.

Bearing the above object in mind, a rotating electrical machine according to the present invention includes a rotor, a stator core that is arranged so as to surround the rotor and has a plurality of axially extending slots arranged at a predetermined pitch in a circumferential direction, and a stator having a stator winding fitted into the slots. The stator core comprises element iron cores of a hexahedral shape which are deformed to curve, with their adjacent end faces being abutted against each other and bonded to each other, each of the element iron cores being composed of individual thin steel plates laminated and integrated with one another, with concave and convex portions formed on the individual thin steel plates being placed into fitting engagement with each other. The concave and convex portions are formed on a borderline between a compressive region of the stator core at an inner diameter side thereof which is subjected to compressive stress occurring upon bending deformation of the element iron core and a tensile region of the stator core at an outer diameter side thereof which is subjected to tensile stress.

According to the rotating electrical machine of the present invention, reduction in the binding force of mutually adjacent thin steel plates can be suppressed without the provision of new equipment, thus making it possible to improve the quality and performance thereof.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENTS

Now, a preferred embodiment of the present invention will be described in detail while referring to the accompanying drawings. Embodiment 1.

Figure 1:
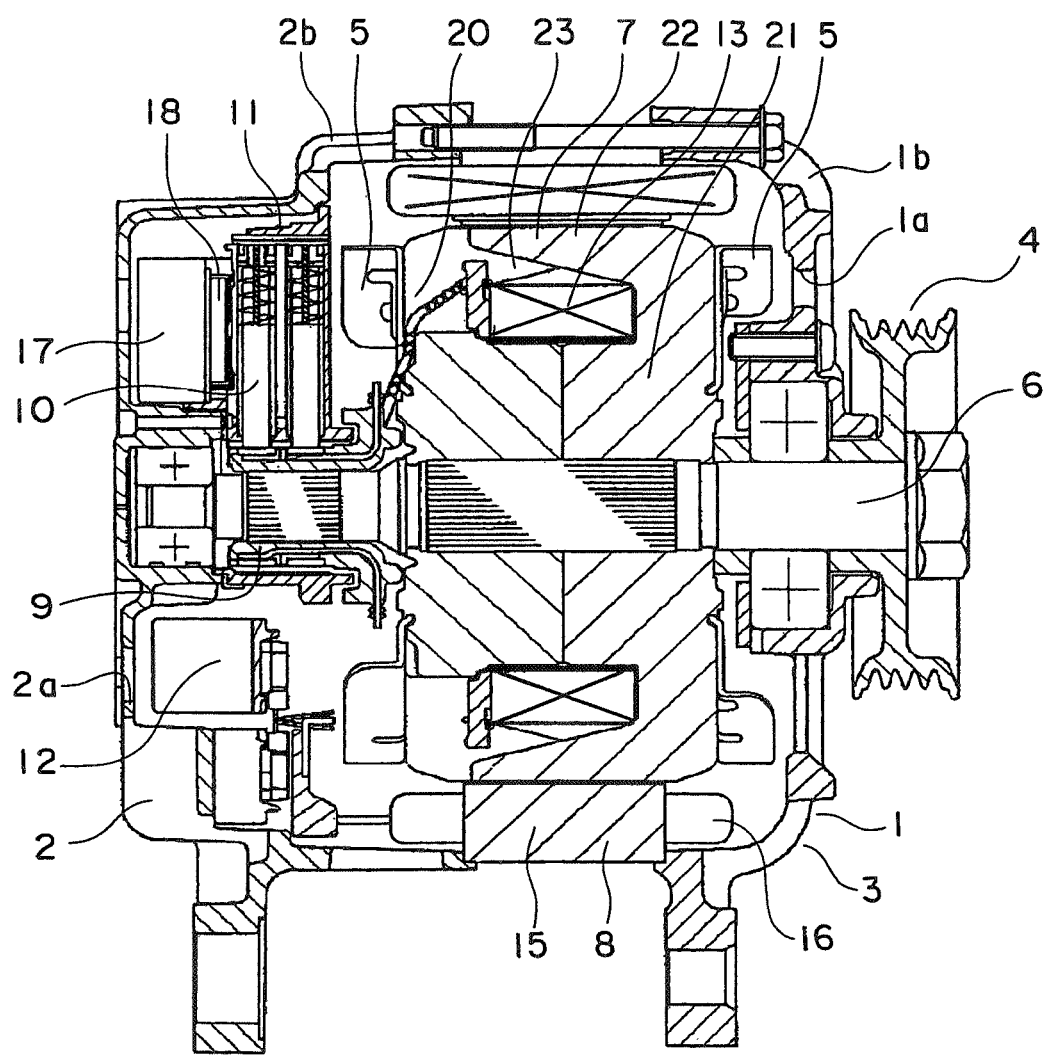
FIG. 1 is a cross sectional view showing a vehicular alternator according to a first embodiment of the present invention.
Figure 2:
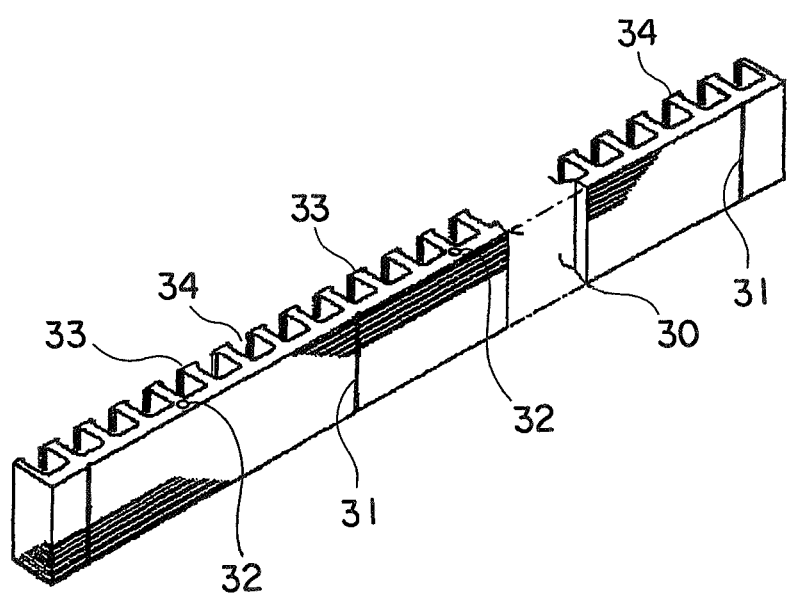
FIG. 2 is a perspective view showing an element iron core in a preliminary process or step in which a stator core in FIG. 1 is formed.
Figure 3A:
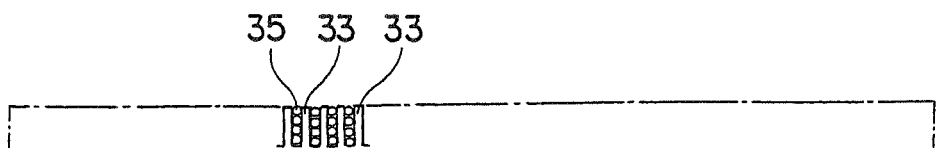
FIG. 3A is a partial construction view when a stator winding is fitted on an element iron core of FIG. 2.
Figure 3B:
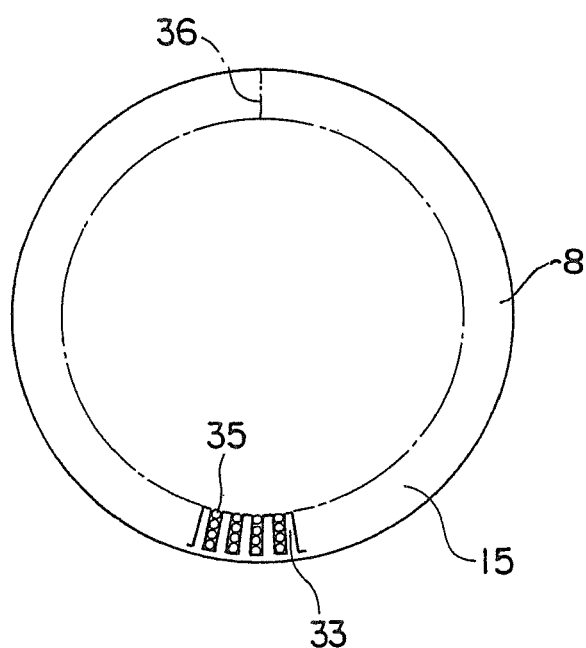
FIG. 3B is a construction view when an element iron core of FIG. 3A has been deformed to bend or curve.

Referring to the drawings and first to FIG. 1, there is shown, in a cross sectional view, the construction of a vehicular alternator according to a first embodiment of the present invention. FIG. 2 is a perspective view of an element iron core 30 in a preliminary process or step in which a stator core 15 in FIG. 1 is formed. FIG. 3A is a partial construction view when a stator winding 16 is fitted on the element iron core 30 of FIG. 2, and FIG. 3B is a construction view of a stator 8 when the element iron core 30 in FIG. 3A has been deformed to bend or curve.

This alternator, which serves as a rotating electrical machine, includes a case 3 that is composed of a front bracket 1 and a rear bracket 2 both made of aluminum, a shaft 6 that is arranged in the case 3 with a pulley 4 being fixedly mounted on one end portion thereof, a Randel type rotor 7 fixedly mounted on the shaft 6, a pair of air cooling fans 5 fixedly attached to the opposite side surfaces of the rotor 7, and a stator 8 fixedly secured to an inner wall surface of the case 3.

In addition, the alternator further includes a pair of slip rings 9 that are fixedly secured to the other end of the shaft 6 for supplying current to the rotor 7, a pair of brushes 10 that are slidable on and along the slip rings 9, a brush holder 11 that receives the brushes 10, a commutator 12 that is electrically connected to the stator 8 for commutating an alternating current generated in the stator 8 into a direct current, a heat sink 17 that is fitted into the brush holder 11, and a regulator 18 that is attached to the heat sink 17 for regulating the magnitude of an alternating voltage generated in the stator 8.

The rotor 7 is composed of a rotor coil 13 that generates a magnetic flux when an electric current flows therethrough, and a pair of field cores 20, 21 that are arranged to as to enclose the rotor coil 13 with their magnetic poles being formed by the magnetic flux thus generated in the field cores 20, 21. The pair of field cores 20, 21 are made of iron, and are fixedly secured to the shaft 6 with their eight hook-shaped magnetic poles 22, 23 being formed on their outer peripheral edges, respectively, in such a manner that they are arranged apart from one another at an equal pitch in the circumferential direction so as to be in opposed engagement with each other.

The stator 8 includes the stator core 15 that is composed of a plurality of cylindrical-shaped laminated iron cores having a plurality of axially extending slots 34 formed at a predetermined pitch in the circumferential direction, and a stator winding 16 that is wound around the stator core 15.

Figure 4:
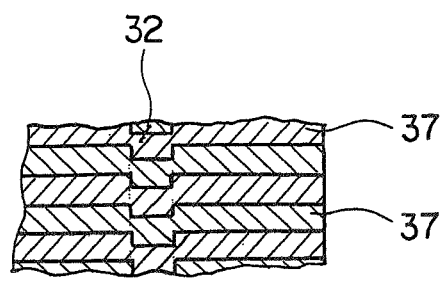
FIG. 4 is a partial cross sectional view of the stator core of FIG. 1.

The stator core 15 is composed of a plurality of thin steel plates 37 that are laminated one over another, as shown in FIG. 4. Each of the thin steel plates 37 has concave and convex portions 32 formed thereon, and the convexes of the concave and convex portions 32 are fitted into adjacent concaves of the concave and convex portions 32 whereby the individual thin steel plates 37 are coupled with one another.

In addition, the front bracket 1 and the rear bracket 2 have intake air holes 1a, 2a formed in the axially opposite side portions thereof, respectively, and exhaust holes 1b, 2b formed in shoulder portions thereof, respectively.

The stator core 15 is formed with an abutment welded portion 36 that is produced when the element iron cores 30 each of a hexahedral shape are deformed to bend or curve, with their opposite end faces being fusion joined or bonded to each other while being placed in abutment with each other. The abutment welded portion 36 is formed on a tooth 33 between a pair of adjacent slots 34.

Also, the stator core 15 has a plurality of laminated welded portions 31 formed on its circumferential side surface at circumferential intervals, the laminated welded portions being produced when adjacent thin steel plates 37 are fusion bonded to each other.

The abutment welded portion 36 and the laminated welded portions 31 are continuously formed along the axial direction of the stator core 15 over the entire length thereof by means of $CO_2$ laser welding.

The stator 8 of the vehicular alternator as constructed above is produced according to the following procedure.

First of all, a plurality of thin steel plates 37 are laminated one over another in such a manner that adjacent concave and convex portions 32 are placed into fitting engagement with each other, thereby forming an element iron core 30.

Then, the thin steel plates 37 are mutually integrated with one another by forming laminated welded portions 31 on the circumferential side surface of the hexahedral-shaped element iron core 30 by means of $CO_2$ laser welding.

Subsequently, an insulator (not shown) is placed on the element iron core 30 at its side near slots 34, after which a conductor 35 of a strip-shaped stator winding 16 is pushed into the slots 34 in the element iron core 30 whereby the stator winding 16 is fitted to the element iron core 30.

Finally, the hexahedral-shaped element iron core 30 are deformed by bending into a cylindrical shape, and divided or parted surfaces of a tooth 33 of the element iron core 30 are placed into abutment with each other and then fusion bonded to each other to form a welded portion 36.

In the vehicular alternator of the above-mentioned construction, a current is supplied from a battery (not shown) to the rotor coil 13 through the brushes 10 and the slip rings 9 to generate a magnetic flux, whereby the hook-shaped magnetic poles 22 of one field core 20 are polarized to an N pole and the hook-shaped magnetic poles 23 of the other field core 21 are polarized to an S pole under the action of the magnetic flux. On the other hand, the rotating torque of the engine is transmitted to the shaft 6 through the belt (not shown) and the pulley 4 whereby the rotor 7 is driven to rotate.

As a result, a rotating field is given to the stator winding 16 so that an AC electromotive force is generated in the stator winding 16. The magnitude of the AC electromotive force is controlled by the regulator 18 that regulates the current flowing through the rotor 7. In addition, an alternating current generated by the AC electromotive force can be commutated to a direct current through the commutator 12 so as to be charged to the battery.

Figure 5:
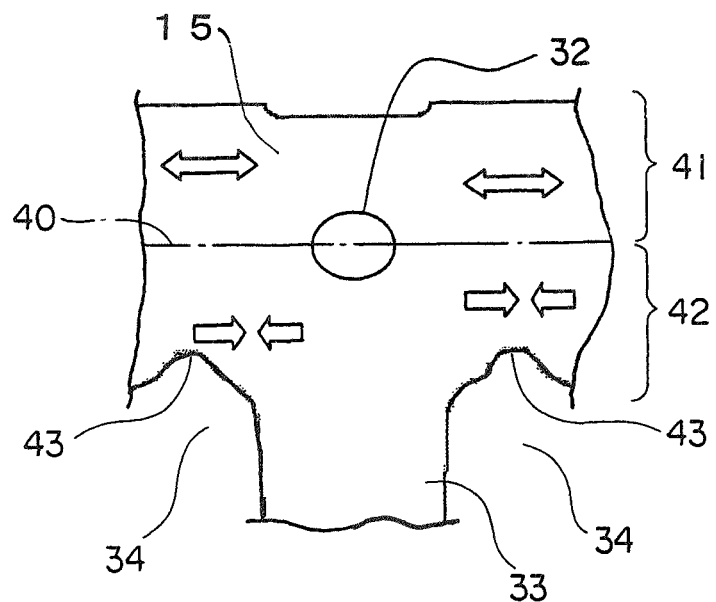
FIG. 5 is a stress distribution chart showing the distribution of stresses occurring in the stator core when the element iron core of FIG. 2 is subjected to curving or bending deformation.

FIG. 5 is a stress distribution chart that shows the distribution of stresses generated in the stator core 15 when the hexahedral-shaped element iron core 30 is subjected to curving or bending deformation.

As can be seen from this chart, a tensile stress is generated in a direction of a double arrow at an outer diameter side of the stator core 15, whereas a compressive stress is generated at an inner diameter side of the stator core 15 in a direction of opposed arrows.

Thus, in the stator core 15, there exists a tensile region 41 in which the tensile stress is generated and a compressive region 42 in which the compressive stress is generated, so in the tensile region 41, the individual thin steel plates 37 are slightly expanded in a circumferential direction, whereas in the compressive region 42, the individual thin steel plates 37 are slightly compressed in a circumferential direction.

The above-mentioned concave and convex portions 32 are formed on a borderline 40 between the tensile region 41 and the compressive region 42.

Moreover, in the compressive region 42, there is formed a notched portion 43 on a bottom of each slot 34. Thus, when the element iron core 30 is deformed to bend or curve into a cylindrical shape, a major portion of an amount of bending or curving deformation in the compressive region 42 can be absorbed by the notched portions 43, so the compressive stress is accordingly less prone to reach the concave and convex portions 32. Here, note that in FIG. 2, the notched portions 43 are omitted.

Figure 6A:
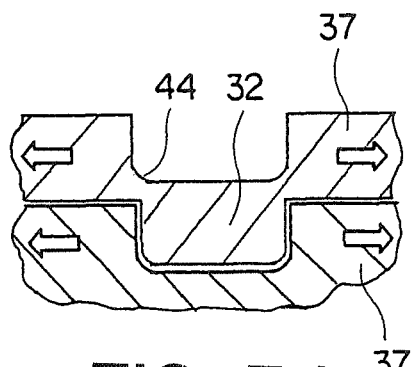
FIG. 6A is a stress distribution chart showing the distribution of stresses occurring in concave and convex portions when the concave and convex portions are formed in a tensile region.
Figure 6B:
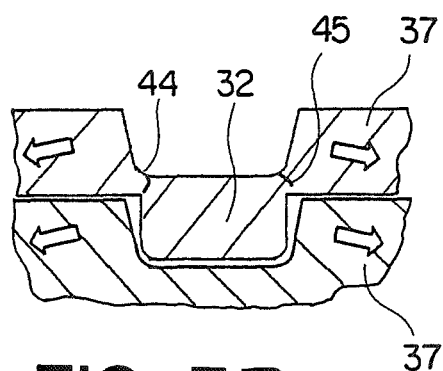
FIG. 6B is an explanation view showing the deformation of concave and convex portions when the concave and convex portions are formed in the tensile region.

FIGS. 6A and 6B are explanation views showing the deformation of concave and convex portions 32 when the concave and convex portions 32 are formed in the tensile region 41, i.e., at an outer diameter side of the stator core 15.

In the concaves of the concave and convex portions 32 of the individual thin steel plates 37, stress is applied thereto in a direction to expand an opening portion (FIG. 6A), whereby the opening portion is deformed to expand (FIG. 6B). As a result, a circumferential gap occurs between the convexes of the concave and convex portions 32 of thin steel plates 37 and the concaves of the concave and convex portions 32 of adjacent thin steel plates 37 into which the convexes are fitted, so the binding force of mutually adjacent thin steel plates 37 reduces. In addition, a crack 45 is easy to occur in a corner portion 44 of each concave of the concave and convex portions 32, and if occurred, it is difficult to restore the binding force.

Figure 7A:
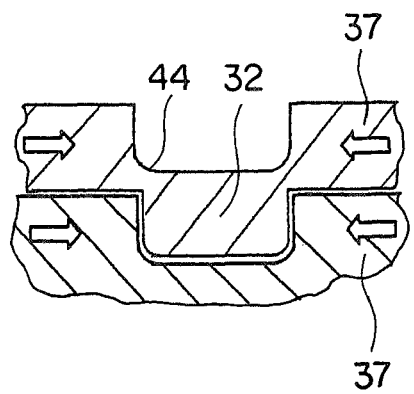
FIG. 7A is a stress distribution chart showing the distribution of stresses occurring in concave and convex portions when the concave and convex portions are formed in a compressed region.
Figure 7B:
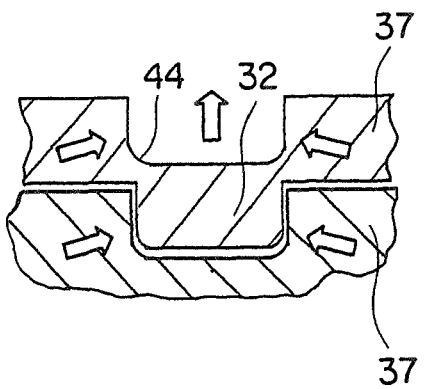
FIG. 7B is an explanation view showing the deformation of concave and convex portions when the concave and convex portions are formed in the compressed region.

FIGS. 7A and 7B are explanation views showing the deformation of concave and convex portions 32 when the concave and convex portions 32 are formed in the compressive region 42, i.e., at an inner diameter side of the stator core 15.

In the individual concaves of the concave and convex portions 32 of the individual thin steel plates 37, stress is applied thereto in a direction to push up the convexes of adjacent concave and convex portions 32 (FIG. 7A), whereby gaps occur between the adjacent thin steel plates 37, reducing the mutual binding forces of the thin steel plates 37 (FIG. 7B).

Although the concave and convex portions 32 of the thin steel plates 37 are formed by means of press working, each corner portion 44 tend to have an R (rounded) shape larger than that at a corner of each convex of the concave and convex portions 32 from the view point of processing, and in this case, the force in the direction to push up the convexes further increases.

In the stator core 15 according to this embodiment, the concave and convex portions 32 are formed on the borderline 40 between the tensile region 41 and the compressive region 42, so the concave and convex portions 32 have regions that receive tensile stress and compressive stress as well as regions in which there occurs no stress or no deformation, and hence reduction in the binding force of the adjacent thin steel plates 37 can be suppressed to a minimum as a whole.

Accordingly, in the regions other than the laminated welded portions 31, too, it is possible to suppress the occurrence of gaps between the adjacent thin steel plates 37 and the circumferential and diametrical displacements of the thin steel plates 37 upon bending or curving deformation of the element iron core 30, as a result of which magnetic noise and the distortion of a magnetic circuit can be reduced, thus making it possible to improve the quality and performance of the alternator.

Here, note that the configuration, arrangement, etc., of the concave and convex portions 32 are merely one example, but not limited to what is illustrated in the drawings. In addition, although the borderline 40 is shown as linear in FIG. 5, the position of the borderline 40 may vary according to the rigidity, thickness, etc., of each of the thin steel plates 37, and the borderline 40 has a variety of modes such as a wavy line, etc. In FIG. 5, one example is shown as visualized for the sake of easy understanding.

In addition, although the stator core 15 is deformed to bend or curve into a cylindrical shape after the stator winding 16 has been received in the slots 34 of the stator core 15, the stator winding 16 is press-fitted into the slots 34 after bending or curving deformation of the stator core 15.

Moreover, the stator winding 16 need not be aligned but may be arranged in a variety of modes or fashions.

Further, the present invention is not limited to the stator core 15 for a vehicular alternator but may be applied to stator cores for alternators other than vehicular alternators, or the invention may also be applied to a stator core of an electric motor.

Furthermore, the element iron core 30 may be formed of block bodies which are divided into two or more pieces and mutually coupled with each other.

While the invention has been described in terms of a preferred embodiment, those skilled in the art will recognize that the invention can be practiced with modifications within the spirit and scope of the appended claims.

What is claimed is:

1. A rotating electrical machine comprising:
a rotor;
a stator core that is arranged so as to surround said rotor and has a plurality of axially extending slots arranged at a predetermined pitch in a circumferential direction; and
a stator having a stator winding fitted into said slots;
wherein said stator core comprises element iron cores of a hexahedral shape which are deformed to curve, with their adjacent end faces being abutted against each other and bonded to each other, each of said element iron cores being composed of individual thin steel plates laminated and integrated with one another, with concave and convex portions formed on said individual thin steel plates being placed into fitting engagement with each other; and
said concave and convex portions are formed on each individual steel plate on a borderline between a compressive region of said stator core at an inner diameter side thereof subjected to compressive stress occurring upon bending deformation of said element iron core during its formation and a tensile region of said stator core at an outer diameter side thereof subjected to tensile stress during formation,
wherein said concave and convex portions are formed on each individual steel plate along said borderline at circumferential locations between adjacent ones of said slots,
wherein, upon bending deformation of the stator core, the concave and convex portions have tensile regions and compressive regions that receive tensile stress and compressive stress, respectively, as well as said borderline, having a shape defined by a single line, which is a transition between the tensile region and the compressive region,
wherein each of the plurality of axially extending slots has a first side, a second side opposite the first side, and a third side adjacent to the first side and the second side,
wherein each of the plurality of axially extending slots has a first cutout notched portion, formed on the third side and being adjacent to the first side, and a second cutout notched portion, formed on the third side and being adjacent to the second side,
the first cutout notch portion and the second cutout notch portion being configured to absorb a portion of bending deformation.

2. The rotating electrical machine as set forth in claim 1, wherein said stator core is a stator core of a vehicular alternator.

3. The rotating electrical machine as set forth in claim 1, wherein said borderline is perpendicular to the axially extending slots.

4. The rotating electrical machine as set forth in claim 1, wherein said first notched portion and second notched portion extend farther toward the outer diameter side of the stator core than the third side of the axially extending slot.

5. The rotating electrical machine as set forth in claim 1, wherein said borderline has a shape defined by a circumferential line.

* * * * *